(12) United States Patent
Zanger et al.

(10) Patent No.: US 7,027,209 B2
(45) Date of Patent: Apr. 11, 2006

(54) OPTICAL RESONANT FREQUENCY CONVERTER

(75) Inventors: Eckhard Zanger, Seddiner See (DE); Manfred Salzman, Berlin (DE)

(73) Assignee: NLG New Laser Generation GmbH, (DE)

(*) Notice: Subject to any disclaimer, the term of this patent is extended or adjusted under 35 U.S.C. 154(b) by 321 days.

(21) Appl. No.: 10/450,599

(22) PCT Filed: Dec. 13, 2001

(86) PCT No.: PCT/EP01/14666

§ 371 (c)(1),
(2), (4) Date: Nov. 14, 2003

(87) PCT Pub. No.: WO02/48785

PCT Pub. Date: Jun. 20, 2002

(65) Prior Publication Data

US 2004/0071179 A1   Apr. 15, 2004

(30) Foreign Application Priority Data

Dec. 14, 2000 (DE) ................................ 100 63 977

(51) Int. Cl.
*G02F 1/35* (2006.01)
*H01S 3/109* (2006.01)

(52) U.S. Cl. ........................................ 359/326; 372/22

(58) Field of Classification Search ........ 359/326–332; 372/21–22

See application file for complete search history.

(56) References Cited

U.S. PATENT DOCUMENTS 5,027,361 A     6/1991   Kozlovsky et al.
5,943,350 A     8/1999   Shichijyo
6,069,903 A     5/2000   Zanger et al.
6,317,449 B1 *  11/2001  Zanger et al. .............. 372/100
6,424,453 B1    7/2002   Zanger et al.

FOREIGN PATENT DOCUMENTS

DE    198 32 647 C1    3/2000
DE    199 23 005 A1    11/2000

(Continued)

OTHER PUBLICATIONS

Ashkin, et al, "Resonant Optical Second Harmonic Generation and Mixing," Journal of Quantum Electronics, Jun. 1966 ed., vol. 2 (No. 6), p. 109-124, (Jun. 10, 1966).

(Continued)

*Primary Examiner*—John D. Lee
(74) *Attorney, Agent, or Firm*—Hahn Loeser & Parks, LLP; Robert J. Clark

(57) ABSTRACT

The invention concerns an optical resonant frequency converter comprising two mirrors and a non-linear crystal in a ring resonator arrangement for converting laser radiation into frequency-doubled radiation. Because of the refractive effect of the prism-shaped, non-linear crystal two mirrors are sufficient to form a ring resonator with a total of three optical elements. A suitable choice of the orientation of the crystal axes in relation to the laser beam direction reduces scatter in the crystal. In one embodiment the entry surface of the crystal is at the Brewster angle while the exit surface is perpendicular to the beam and has an antireflection coating. In another embodiment the converted beam is coupled out through a polarisation beam splitter layer on one of the crystal surfaces. In a further embodiment the crystal surfaces are cylindrically curved. That produces an elliptical beam profile in the crystal, which reduces the walk-off effect.

40 Claims, 3 Drawing Sheets

FOREIGN PATENT DOCUMENTS

JP 04347824 3/1992

OTHER PUBLICATIONS

Brieger, et al, "Enhancement of Single Frequency SHG in a Passive Ring Resonator," Optics Communications, vol. 38 (No. 5,6), p. 423-426, (Sep. 1, 1981).

G.D. Boyd, "Parametic Inateration of Focused Gaussian Light Beam," Journal of Applied Physics, vol. 39 (No. 8), p. 3597-3609, (Jul. 10, 1968).

Augustov, et al, "Photorefraction and Anisotropic Light Scattering in LiNbO3-Fe Crystals," Applied Physics A, p. 169-172, (Nov. 10, 1982).

K. Kato, "Second-Harmonic Generation to 2024 Å in β-BaB2O4," Journal of Quantum Electronics, vol. 22 (No. 7), (Jul. 10, 1986).

Brozek et al, "Highly efficient cw frequency doubling of 854 nm GaAlAs diode laser in an external ring cavity," Optics Communications, Elsevier Science BV, p. 141-46, (Jan. 15, 1998).

* cited by examiner

OPTICAL RESONANT FREQUENCY CONVERTER

The invention concerns an optical resonance frequency converter comprising a ring resonator which includes a first mirror, a second mirror and a non-linear crystal with an entry surface and an exit surface, wherein formed in the ring resonator is a light wave which circulates in a resonator plane and which passes into the non-linear crystal as a first laser beam through the entry surface and issues therefrom again through the exit surface and which is partially converted in the non-linear crystal into a second laser beam which is of a different frequency from the first laser beam. In particular the invention relates to an optical resonant frequency doubler, that is to say a frequency converter which produces a light wave at double the frequency of an incoming light wave.

BACKGROUND OF THE ART

An optical resonant frequency converter is used to produce in a particularly efficient manner from a laser beam involving a fundamental wavelength, referred to hereinafter as the fundamental wave, by non-linear conversion in a suitable non-linear crystal, a laser beam involving a higher and in particular doubled frequency, referred to hereinafter as the converted beam. The technology of non-linear conversion is used whenever a suitable active laser material is not available for the direct production of the desired wavelength. Because of the long service life and high level of efficiency semiconductor lasers and diode-pumped solid state lasers (DPSS lasers) are nowadays increasingly used to produce continuous laser light in the red and infrared spectral range. Shorter wavelengths can then usually be produced by non-linear conversion. Conversion can take place in a plurality of steps. In the case of DPSS lasers the first conversion step is effected to produce visible laser radiation frequently in the laser resonator itself ('intracavity doubling'). The further conversion to still shorter wavelengths is preferably implemented outside the laser resonator. Particularly in the case of non-linear production of continuous UV laser light, resonant frequency doubling in an external resonator plays a significant part as the crystal materials available for that wavelength range have only low non-linear coefficients and therefore non-resonant conversion is too inefficient for practical use. The combination of an intracavity-frequency-doubled DPSS laser or a semiconductor laser with a resonant frequency converter affords a laser source for continuous UV laser light which has many different applications in the semiconductor, consumer electronics and telecommunications industry.

The principle of resonant frequency doubling has long been known (see for example Ashkin et al 'Resonant Optical Second Harmonic Generation and Mixing', Journal of Quantum Electronics, QE-2, 1966, page 109; or M Brieger et al 'Enhancement of Single Frequency SHG in a Passive Ring Resonator', Optics Communications 38, 1981, page 423). In that case the fundamental wave is coupled into an optical resonator comprising mirrors and which is resonantly tuned to the frequency of the fundamental wave. For that purpose the optical length of the resonator is so set by means of a suitable device that it is an integral multiple of the fundamental wavelength. If the losses in the resonator are low and the coupling-in mirror is of a partially transparent nature with a suitably selected degree of reflection, then an enhancement in resonance takes place, that is to say the power of the light wave circulating in the resonator is greater than the power of the fundamental wave which was radiated in from the exterior. The degree of reflection R of the coupling-in mirror is at an optimum when the following applies:

$$R = 1 - V$$

wherein V denotes the relative losses of the circulating light wave in a revolution in the resonator, hereinafter referred to as resonator losses. Under that condition referred to as 'impedance matching' the enhancement factor is:

$$A = 1/V,$$

that is to say the light wave circulating in the resonator has A-times the power of the light wave which is radiated in. In practice enhancement factors of between 100 and 200 are achieved.

Disposed in the resonator is a non-linear crystal through which the circulating fundamental wave is radiated and which, by non-linear conversion, produces a second light wave at double the frequency, which is coupled out of the resonator by a resonator mirror which is transparent at that double frequency.

So that production of the converted beam takes place with a usable level of efficiency, phase matching must occur in the non-linear crystal, that is to say the refractive index of the crystal at the fundamental wavelength must be of the same magnitude as its refractive index at the converted wavelength. Phase matching can be effected by angle tuning (critical phase matching) or by temperature matching (non-critical phase matching). In the case of non-critical phase matching the efficiency of frequency conversion is generally higher and the beam profile of the converted beam is of higher quality, that is to say closer to the desired Gaussian beam shape. The crystal materials available at the present time however permit the use of non-critical phase matching only for a few, narrow wavelength ranges. In particular at the present time no crystal material exists, with which laser light can be produced in the low UV range with non-critical phase matching.

As the power of the converted beam is proportional to the square of the power density of the fundamental wave, the level of efficiency of non-linear conversion is increased when the fundamental wave is focused in the non-linear crystal. Therefore the resonator mirror is generally provided with spherically curved surfaces so that a beam waisting effect is formed in the middle of the crystal. The power density in the crystal can be increased by reducing the beam waisting. The divergence of the beam in the crystal, which increases at the same time, reduces however the level of conversion efficiency in crystals which are substantially longer than the waist region (Raleigh length) of the beam. There is therefore an optimum size of the beam waist which can be adjusted by suitable selection of the spacings and the radii of curvature of the resonator mirrors.

Due to the resonant enhancement of the fundamental wave power in the resonator the level of conversion efficiency is increased in comparison with a non-resonant arrangement, by some orders of magnitude. Thus for example the levels of conversion efficiency which can be achieved with the present-day state of the art, for producing UV laser radiation at 266 nm, are between 20% and 40% when a fundamental wave power of between 1W and 5W is available. In that power range saturation of efficiency already occurs so that development endeavours are unnecessary at least in regard to conversion efficiency. When using fundamental wave lasers in the power range of between 10 mW and 100 mW which are suitable for building particularly compact UV lasers however the conversion efficiency of a frequency converter in accordance with the state of the art is unsatisfactorily low as that power range still involves a quadratic dependency on the fundamental wave power.

In general terms adverse effects in terms of the output power of a laser with frequency converter occur by virtue of various phenomena discussed hereinafter.

The object of the invention is to provide a frequency converter which substantially avoids power impairments.

SUMMARY OF THE INVENTION

The way in which that object is attained starts with an analysis of the power-impairing phenomena and involves the following structural features which individually or in combination lead to a resonant frequency converter with critical phase matching, which enjoys a higher level of conversion efficiency, better beam quality and a higher degree of power stability of the converted beam than arrangements in accordance with the state of the art. A higher level of conversion efficiency with a low fundamental wave power is intended in particular to afford the possibility of producing a laser source for UV radiation, which is of substantially more compact dimensions than is possible in the state of the art.

The features which attain the object of the invention individually or in combination are, in a frequency converter of the kind set forth in the opening part of this specification:

the exit surface of the non-linear crystal is antireflectively coated both for the frequency of the first and also the second laser beam and the normal to the exit surface is at an angle of less than 15 degrees relative to the light wave issuing from the crystal, wherein the second laser beam preferably also issues from the non-linear crystal through the exit surface, and wherein the first laser beam passes into the ring resonator through the first mirror and the second laser beam issues from the ring resonator through the first mirror;

alternatively the normal to the exit surface of the non-linear crystal is approximately at the Brewster angle relative to the light source issuing from the crystal, the light wave circulating in the ring resonator is polarised parallel to the resonator plane, the exit surface of the non-linear crystal is provided with a polarisation beam splitter layer which is substantially transparent to the frequency of the first laser beam and reflecting to the frequency of the second laser beam, the non-linear crystal has a third surface which is antireflectively coated for the frequency of the second laser beam and the non-linear crystal is so shaped that the second laser beam is reflected at the polarisation beam splitter layer and issues from the non-linear crystal through the third surface;

in combination with or independently of those features the crystallographic axes of the non-linear crystal are so oriented with respect to the direction of the incident light wave that the square of the effective non-linear coefficient is near to or equal to the maximum value in respect of its angular dependency and that the non-linear crystal scatters as small a part as possible of the incident light wave into the direction opposite to the direction of propagation of the incident light wave; and optionally at least the entry or the exit surface of the non-linear crystal has a cylindrical curvature, wherein the axes of symmetry of said cylindrical surfaces are in the resonator plane and at least one of the two mirrors has a cylindrical curvature whose axes of symmetry are perpendicular to the resonator plane, wherein the principal section plane of the non-linear crystal is perpendicular to the resonator plane and the beam cross-section of the light wave in the non-linear crystal is of an elliptical shape whose longer semiaxis is in the principal section plane of the non-linear crystal.

By virtue of those features individually or in combination, in comparison with arrangements in accordance with the state of the art, the resonator losses are reduced, the effect of birefringence on efficiency and beam quality in critically phase-matched crystals is reduced and backscatter of the fundamental wave in the non-linear crystal, which can result in instability of the output power, is reduced.

Set out hereinafter is a discussion of the realisations on which the invention is based:

Inter alia the level of conversion efficiency is reduced by the walk-off effect which occurs with critical phase matching, a consequence of birefringence (see for example Boyd et al, Journal of Applied Physics 39, 1968, page 3597). The crystal material BBO frequently used for UV production has a particularly great walk-off effect. FIG. 1 diagrammatically shows the beam paths in the case of frequency doubling in accordance with type I in a negatively uniaxial non-linear crystal with critical phase matching. The fundamental wave 7 is radiated in at a given angle θ (phase matching angle) relative to the optical axis 9 of the non-linear crystal 3. At that angle the refractive indices for the fundamental wave no and for the converted beam $n_e$ are equal.

The fundamental wave represents the ordinary beam, that is to say it is polarised perpendicularly to a plane which contains the fundamental wave beam and the optical axis of the crystal. That plane is referred to as the principal section plane. In FIG. 1 the principal section plane is in the plane of the paper. The converted beam 8 is polarised parallel to the principal section plane, that is to say perpendicularly to the fundamental wave, and thus represents the extraordinary beam. The latter experiences birefrigence, that is to say it is deflected within the principal section plane through the walk-off angle ρ with respect to the ordinary beam. If the fundamental wave within the crystal has a beam radius $w_0$ the two waves begin to significantly diverge at a spacing $$l_a = \frac{w_0 \sqrt{\pi}}{\rho}$$

considered from the point of entry into the crystal. If the length l of the crystal is greater than $l_a$, coupling of the fields within the crystal is markedly attenuated and thus the level of conversion efficiency is reduced (see Ashkin et al, Journal of Quantum Electronics, QE-2, 1966, page 109). The reduction in efficiency due to the walk-off effect can be avoided by an elliptical beam shape for the fundamental wave. If instead of a round beam profile with a beam radius $w_0$, with a given crystal length l, an elliptical beam profile with the semiaxes $w_x$ and $w_y$, is selected, in accordance with the following:

$$w_y = \frac{\rho * l}{\sqrt{\pi}}$$

$$w_x = \frac{w_0}{w_y}$$

wherein $w_y$ is the longer semiaxis in the direction of the principal section plane and $w_x$ is the shorter semiaxis in the direction perpendicular thereto, the walk-off effect is substantially eliminated. In that case the power density of the fundamental wave is retained and decoupling of the fields is avoided.

U.S. Pat. No. 5,943,350 proposes an arrangement for resonant frequency doubling, in which the fundamental wave within the non-linear crystal is of an elliptical shape. Here a crystal in the form of a prism or trapezium is used, wherein a plane which contains the incident beam and the normal to the entry surface and a direction in which the crystal has a small acceptance angle for phase matching are said to be parallel. This means that, in this arrangement, the principal section plane coincides with the plane of incidence of the crystal entry surface. A laser beam with a round beam profile which passes into the crystal in the described manner, due to refraction at the optically denser crystal medium, automatically acquires an elliptical shape with the longer semiaxis in the principal section plane, thereby reducing the action of the walk-off effect. The ratio of the axes of the elliptical beam cross-section increases, the greater the angle of incidence is selected to be. For a ratio between the axes of 2:1 in the case of BBO and a wavelength of 532 nm, an angle of incidence of 65° for example is required. For effective elimination of the walk-off effect, on the basis of the usual dimensions for crystal length and beam cross-section however, a ratio between axes of the order of magnitude of 10:1 is required. That would require an angle of incidence of about 85°.

In the case of frequency doubling in accordance with type I the polarisation of the fundamental wave must be perpendicular to the principal section plane, in this case therefore perpendicular also to the plane of incidence. In the case of polarisation perpendicularly to the plane of incidence, referred to hereinafter as s-polarisation, and with high angles of incidence, considerable reflection losses occur with an uncoated entry surface for the crystal. With an angle of incidence of 85° the reflection losses would be over 80%. Antireflection coatings are normally only very limitedly effective at angles of incidence above 50° and with s-polarisation. The reflection losses cannot be reduced under those conditions to a usable value in the range below 1 percent so that the gain in efficiency by virtue of the reduction in the walk-off effect is nullified again by a loss in efficiency due to the higher resonator losses. A higher level of efficiency in contrast can be achieved if the fundamental wave is polarised parallel to the plane of incidence, referred to hereinafter as p-polarisation, and at the same time the large semiaxis of the beam cross-section is in the principal section plane.

The walk-off effect also has a detrimental action on the beam profile of the laser beam produced by frequency doubling. As illustrated in DE 198 32 647 the beam profile, in the near-field region which in the case of typical conditions extends over a spacing of between some 10 cm and 1 m from the beam source, has interference fringes which make the beam profile useless for many uses in that distance range. Due to the presence of imaging optical elements within the near-field range, the beam profile which is interference-like distorted can even be extended into infinity. DE 198 32 647 describes measures which are intended to prevent the beam profile having such unwanted distortion phenomena in the remote field. However, no measures are specified for improving the beam profile in the near field.

Most laser sources react with fluctuations in their output power and frequency if the emitted laser light is partially or entirely reflected back into the laser by a mirror. Basically such problems are to be encountered with a resonant frequency converter with linear resonator as the coupling-in mirror of the resonator is perpendicular to the coupled-in beam and the latter is therefore reflected back exactly into the laser source. In the case of a ring resonator in contrast the situation involves an angle of incidence which is different from zero so that no direct retroreflection from the coupling-in mirror of the resonator into the laser source can occur. For that reason the ring resonator is generally preferred to the linear resonator. However the fundamental wave which circulates in the ring resonator is scattered to a certain proportion in various directions in space by the non-linear crystal. Because of the resonant enhancement of the fundamental wave in the resonator, the intensity of the scattered light can assume considerable values. The proportion of the light, which is scattered in precisely the opposite direction to the direction of the fundamental wave which is radiated in can circulate in the resonator like the radiated-in fundamental wave itself, only in the reverse direction. As the scattered light is of the same frequency as the radiated-in laser light, resonance enhancement also takes place for the scattered light so that that becomes a directed laser beam with a level of intensity which is not to be disregarded. This wave which passes backwards in the resonator is partially transmitted by the coupling-in mirror of the resonator and is thereby passed precisely back into the laser source. With certain laser sources the intensity of that resonance-enhanced, backscattered light is already sufficient to have a considerable adverse effect on frequency and power stability. That applies for example for argon ion lasers in monomode operation. That phenomenon is particularly strongly pronounced in the case of semiconductor lasers in monomode operation. The power of the converted beam is subjected to very great fluctuations in that case as it depends both on the frequency and also the power of the fundamental wave.

The power $P_2$ of the converted beam produced in the non-linear crystal is calculated, with resonant frequency doubling, in accordance with the following:

$$P_2 = \gamma * (A * P_1)^2$$

wherein P1 is the power of the fundamental wave coupled into the resonator and $\gamma$ is the conversion coefficient which depends on the wavelength, the beam diameter in the crystal, the material properties of the crystal used and the length of the crystal.

The conversion efficiency $\eta$ of the resonant frequency doubler is given by:

$$\eta = P_2/P_1 = \gamma * A^2 * P_1$$

With a given fundamental wave power $P_1$ therefore the conversion efficiency $\eta$ can be increased both by increasing the enhancement factor A and also by increasing the conversion coefficient $\gamma$.

In order to increase the enhancement factor A=1/V, the resonator losses V must be reduced. Because of the quadratic dependency on the enhancement factor A the conversion efficiency is very sensitively dependent on the resonator losses. The resonator losses are essentially composed of the residual transmission of all resonator mirrors with the exception of the coupling-in mirror, the reflection losses at the interfaces of the crystal, the scatter and absorption losses in the crystal material and the loss due to non-linear conversion. With the fundamental wave powers and crystal materials considered here for the production of UV light the loss due to non-linear conversion plays a subordinate part as the non-linear coefficients of those materials are so low that the proportion of power converted per crystal transit is negligibly low.

The scatter and absorption losses in the non-linear crystal represent a substantial contribution to the resonator losses. In general that is the largest single contribution to resonator losses. Those losses are proportional to the length of the light path of the fundamental wave in the crystal. Therefore the losses can be reduced by reducing that light path. Therefore, in regard to the highest possible level of conversion efficiency, arrangements are disadvantageous, in which the fundamental wave passes through the crystal on light paths which do not make any contribution to conversion. That is the case for example with monolithic arrangements (see for example U.S. Pat. No. 5,027,361) or semi-monolithic arrangements (see for example U.S. Pat. No. 6,069,903) where one or more crystal surfaces are in the form of resonator mirrors and reflect the fundamental wave within the crystal at an angle with respect to the in-radiation direction. The light path within the crystal then comprises a plurality of portions which are not mutually parallel. Therefore, phase matching can apply only in respect of one of the portions while however all portions produce scatter losses. In the invention therefore the preference is for an arrangement in which no reflection phenomena in respect of the fundamental wave take place within the crystal and therefore the light path in the crystal contributes to frequency conversion, over its full length.

Scatter of the fundamental wave in the non-linear crystal reduces not only the level of conversion efficiency due to increased resonator losses but can also result in unstable power as the scatter takes place in part in opposite relationship to the direction of the radiated-in fundamental wave and can adversely affect the laser source in terms of stability due to the backscattered light. As scatter of laser radiation is strongly directionally dependent in many non-linear crystals (see Augustov et al, Appl Phys A29, 1982, page 169), troublesome backscatter can be reduced by suitable orientation of the optical axis of the crystal in relation to the direction of the in-radiated fundamental wave.

So that the condition for critical phase matching is satisfied, that is to say the refractive index for the ordinary and the extraordinary beam are the same, the angle included between the optical axis of the crystal and the propagation direction of the fundamental wave, referred to as the phase matching angle, must involve a given wavelength-dependent amount. Phase matching however is independent of the sign of the two directions. Equally the magnitude of the conversion coefficient is dependent on the angles of the direction in which the fundamental wave is radiated in, with respect to the crystallographic axes of the crystal, but not the sign of the direction.

As shown in FIG. 6 by reference to the example of frequency doubling of laser radiation of the wavelength 532 nm in accordance with type I with the crystal BBO, there are several possibilities in regard to the relative orientation of beam direction and crystallographic axes, which are equivalent in terms of phase matching and the magnitude of the conversion coefficient, but which involve rearward scattering of the fundamental wave, of differing magnitudes. In FIG. 6 the crystallographic axes x and z of the crystal are each in the plane of the paper while the y-axis is perpendicular to the plane of the paper. The z-axis is generally referred to as the optical axis of the crystal, $\theta$ and $\phi$ are the polar angles of the direction of propagation of the fundamental wave with respect to the crystallographic axes of the crystal. With a wavelength of 532 nm the phase matching angle for BBO is:

$$\theta = 47.6°.$$

As the phase matching condition is independent of the sign of the direction of propagation of the laser beam, phase matching also applies when:

$$\theta = 180° - 47.6° = 132.4°.$$

The conversion coefficient $\gamma$ is proportional to the square of the effective non-linear coefficient $d_{eff}$ (Boyd et al, Journal of Applied Physics 39, 1968, page 3597) which depends on both polar angles $\theta$ and $\phi$ which in the case of BBO is given by the following:

$$d_{eff} = (d_{11} \cos 3\phi + -d_{22} \sin 3\phi) \cos \theta + d_{31} \sin \theta.$$

In that case $d_{11}$, $d_{22}$ and $d_{31}$ are the non-linear coefficients of second order (see for example Kato, IEEE Journal of Quantum Electronics, QE-22, 1986, page 1013). As the coefficients $d_{22}$ and $d_{31}$ are negligibly small in relation to $d_{11}$, the square of the effective non-linear coefficient, in a good approximation, is:

$$d_{eff}^2 = d_{11}^2 \cos^2 3\phi \cdot \cos^2 \theta.$$

Instead of the value of 0° which is usual for the angle $\phi$ therefore it is also possible to use the values 60°, 120° and 180° without having to tolerate losses in terms of the magnitude of the conversion coefficient $\gamma$. In particular the four cases shown in FIG. 6, with the values $\theta = 47.6°$ and 132.4° and $\phi = 0°$ and 180° respectively are equivalent in terms of conversion efficiency and phase matching.

With the crystal BBO, a greater degree of backscatter was found in the arrangements a) and b) shown in FIG. 6 than in the case of the arrangements c) and d). With resonant frequency doubling of an argon ion laser in which monomode operation was enforced by means of intracavity reference mode jumps and fluctuations in intensity occurred when using the arrangements a) and b) while stable operation was possible with the arrangements c) and d). Thus the stability properties of a laser beam produced by resonant frequency doubling can be improved by correct orientation of the crystal axes in relation to the direction of propagation of the fundamental wave.

With a crystal of a mirror-symmetrical, cubic or prism-like shape as in FIG. 3 or a point-symmetrical, parallelogram-like shape with a Brewster angle of incidence, an arrangement in accordance with a) or b) in FIG. 6 can always be converted into one of the arrangements in accordance with c) or d) by suitable rotation of the crystal. When producing such crystals therefore it is not necessary to apply any particular care in regard to the sign of the crystal axes as the crystal can also be subsequently put into one of the favourable arrangements c) or d) shown in FIG. 6 by suitable rotation. In contrast, in the case of an asymmetrical crystal 3 as in FIG. 2, the preferred direction of propagation of the fundamental wave in the crystal already has to be predetermined by the configuration of the crystal surfaces. A reversal in the direction of propagation, in the crystal in FIG. 2, would substantially increase the losses of the converted beam on issuing from the crystal. Therefore the manufacturer of such crystals must acquire more precise information in regard to the orientation of the crystal axes, than is usual at the present time. Hitherto it is only usual to specify angle magnitudes without having regard to the sign of the axes.

It is therefore a feature of the invention that the position of the crystal axes of the non-linear crystal in the resonator is established not only by specifying the phase matching angle but also by specifying the sign of the axes.

A further substantial contribution to resonator losses is represented by the reflection losses at the entry and exit surfaces of the crystal. The reflection losses can be reduced either by antireflection coatings or by light incidence at the Brewster angle.

When using the Brewster angle the reflection losses can be reduced markedly below 0.1%. With antireflection coatings degrees of reflection of between 0.1% and 0.2% are generally achieved. Therefore incidence at Brewster angles is preferred in many arrangements for resonant frequency doubling (see for example Adams et al, Optics Communications 79, 1990, page 219; Angelis et al, Applied Physics B 62, 1996, page 333; and Bourzeix et al, Optics Communications 99, 1993, page 89). In those arrangements the crystal is cut in the form of a parallelogram so that entry and exit sides are at Brewster angles relative to the laser beam. Other arrangements prefer a cubic crystal cut in which the entry and exit sides of the crystal are approximately perpendicular to the laser beam and have an antireflection coating (see for example Kondo et al, Optics Letters 23, 1998, page 195).

The reflection loss with incidence at the Brewster angle is heavily dependent on polarisation of the light wave. In order to achieve low resonator losses the fundamental wave must be p-polarised. As the converted beam produced in the crystal involves a different polarisation direction, it suffers from a high level of reflection loss at the Brewster surface. With the most frequently used conversion in accordance with type I polarisation of the converted beam is perpendicular to polarisation of the fundamental wave, that is to say s-polarised. The reflection loss for the converted beam is in this case about 20%. That reflection loss could admittedly also be reduced at this angle of incidence by an antireflection coating but such a coating would at the same time increase the losses for the fundamental wave. That however is to be avoided as the fundamental wave losses have a still greater influence on the output power. The reflection losses of the converted beam at the Brewster surface are tolerated with the known arrangements as the lower losses of the fundamental wave compensate for that loss and in addition production of the crystals with uncoated Brewster surfaces is relatively simple and inexpensive.

In contrast to the Brewster angle antireflection coatings can be produced for small angles of incidence (below 15°), in such a fashion that the reflection losses for both polarisation directions are between 0.1% and 0.2%. It is therefore desirable to provide only the entry side of the non-linear crystal with an uncoated Brewster surface as that surface does not have to transmit any UV light but the exit side is to be provided with an antireflection-coated surface with a small angle of incidence or perpendicular incidence which ensures low reflection losses both for the fundamental wave and also for the second harmonic. The resulting conversion efficiency with such an asymmetrical crystal shape is better than with the hitherto usual either cubic shapes or parallelogram-like Brewster shapes.

With an angle of incidence near the Brewster angle it is also possible to apply a coating which has very low reflection losses for p-polarisation and a very high degree of reflection for s-polarisation. Such layers are generally referred to as polarisation beam splitter layers. If the exit side of the crystal, which is at the Brewster angle, is provided with a polarisation beam splitter layer the p-polarised fundamental wave is transmitted with very low losses while the converted beam is almost completely reflected. The converted beam can be coupled out virtually in loss-free manner through a third surface of the crystal, which has an antireflection coating. As the converted beam is then no longer propagated colinearly with the fundamental wave it does not have to be passed through the coupling-out mirror of the resonator and therefore also suffers no further reflection loss at that mirror. As the reflection loss of the converted beam at an antireflection layer is less than at a resonator mirror which is highly reflective for the fundamental wave, the converted beam is coupled out more efficiently, with this procedure. This procedure also has the advantage that no degradation damage can occur at a resonator mirror, due to the UV radiation.

A further cause of resonator losses represents residual transmission of the resonator mirrors. With the usual coatings residual transmission is between 0.1% and 0.2%. Apart from the coupling-in mirror therefore each resonator mirror contributes markedly to the resonator losses. It is therefore desirable to reduce the number of resonator mirrors to the necessary minimum. In the case of a ring resonator the minimum number of resonator mirrors is three as long as there are no further elements in the resonator. In the invention the non-linear crystal is therefore embodied in a trapezium shape so that its entry surface forms an angle different from zero with respect to its exit surface. As the fundamental wave circulating in the resonator is refracted by the non-linear crystal two resonator mirrors are sufficient to embody a ring resonator.

BRIEF DESCRIPTION OF THE DRAWINGS

The invention is described in greater detail by means of embodiments and with reference to drawings in which.

DETAILED DESCRIPTION OF A PREFERRED EMBODIMENT

Figure 1:
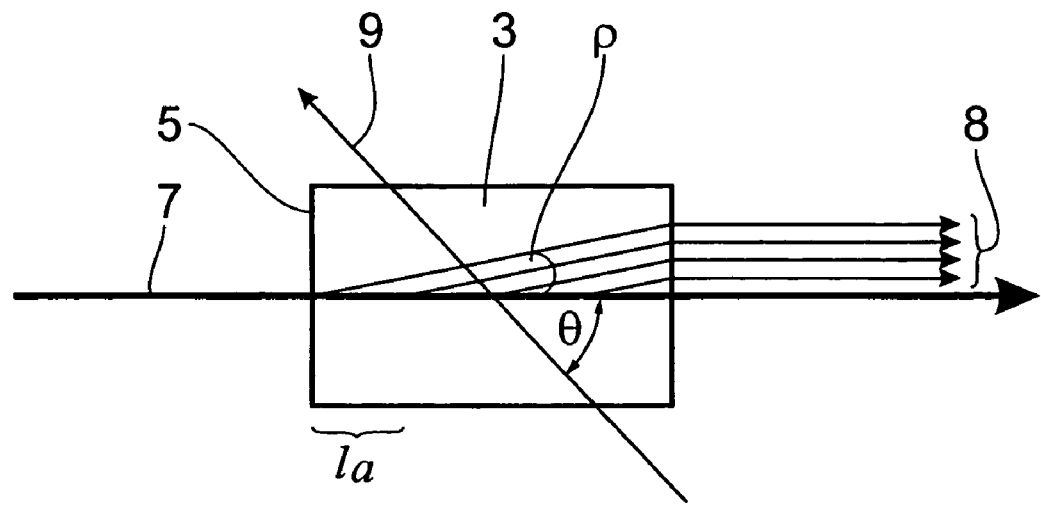
FIG. 1 shows the deflection of the converted beam in the non-linear crystal due to the walk-off effect.
Figure 2:
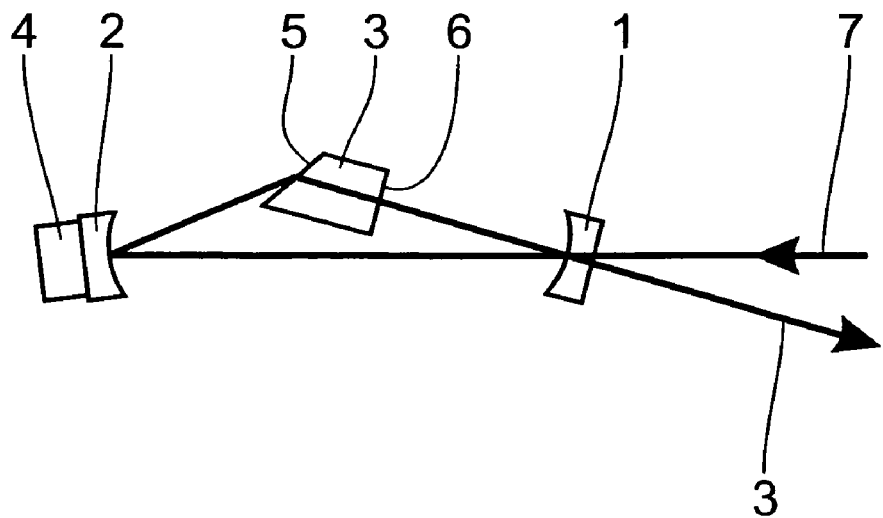
FIG. 2 shows a diagrammatic view of a first embodiment.

In the embodiment of FIG. 2 the mirror 1 is used both as the coupling-in mirror for the fundamental wave 7 and also as the coupling-out mirror for the converted beam 8. The mirror 1 is therefore provided with a coating which at the fundamental wavelength has a reflectivity R which is as close as possible to the optimum value R=1−V, wherein V denotes the resonator losses. At the wavelength of the converted beam the coating should have a level of transmission which is as high possible. The resonator mirror 2 is provided with a coating which is as highly reflecting as possible for the fundamental wavelength and is fixed on a piezo element 4 so that, by applying an electrical voltage, the mirror can be moved and thereby the resonator can be tuned to the frequency of the fundamental wave. As the mirror 2 is not used for coupling in the fundamental wave nor for coupling out the converted beam, both the mirror and also the piezo element can be of very small dimensions without an aperture limitation in respect of a beam passing inclinedly therethrough occurring. Because of the low effective mass of the entire system of mirror and piezo element, that this involves, disturbances due to external influences such as for example acoustic vibrations can be particularly well compensated by active stabilisation of the resonator length, whereby the power stability of the converted radiation produced is improved.

Both resonator mirrors are provided with spherically curved surfaces, the radii of which are such that the fundamental wave circulating in the resonator is periodically reduced and in the middle of the crystal forms a beam waist, the radius of which is as advantageous as possible in terms of conversion efficiency. As the circulating light wave in a ring resonator does not impinge perpendicularly on the resonator mirrors, the focal lengths in the direction which is in the plane of incidence and in the direction perpendicular thereto are of different magnitudes. In that way the beam waists of both directions can be at different locations in the resonator and can be of different magnitudes, which is generally referred to as astigmatism. When the laser beam passes through the crystal under a condition of non-perpendicular incidence, astigmatism also occurs, but with an opposite effect (see for example Kogelnik et al, IEEE Journal of Quantum Electronics, QE-8, 1972, page 373). By virtue of a suitable selection of the angles of incidence on the mirrors, the angle of the crystal surfaces relative to each other and the spacings between the various optical elements, it is possible to provide that there is no astigmatism in the portion of the resonator between the mirror 1 and the mirror 2, that is to say the beam cross-section of the laser beam is round at any location between the two mirrors. As most laser beam sources furnish a round beam profile that substantially simplifies mode matching of the radiated-in fundamental wave to the fundamental mode of the resonator. Mode matching can be implemented with a normal spherical lens while the otherwise necessary astigmatic corrections are not required.

Figure 6A:
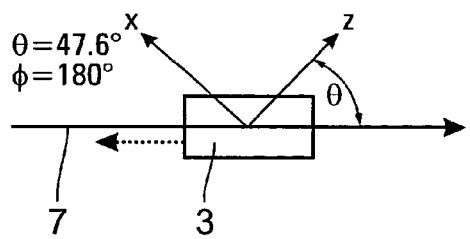
FIG. 6 shows four possible orientations of the axes of the non-linear crystal in relation to the laser beam direction with the same conversion efficiency but different scatter.
Figure 6B:
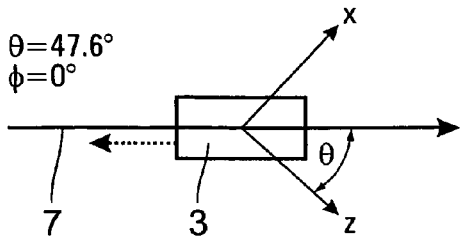
Figure 6C:
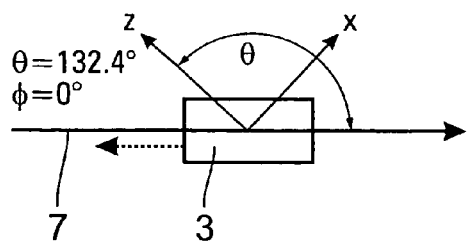
Figure 6D:
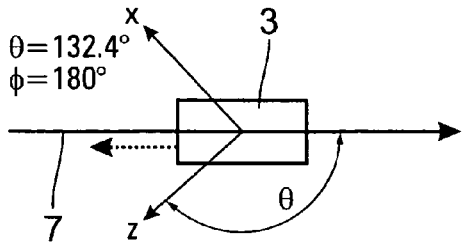

The entry surface 5 of the non-linear crystal 3 is arranged at the Brewster angle relative to the laser beam. The exit surface 6 is substantially perpendicular to the beam and bears an antireflection coating which has a transmission level which is as high as possible both in regard to the fundamental wavelength and also the converted wavelength. The orientation of the crystallographic axes of the non-linear crystal in relation to the laser beam direction is so selected from the possible options which are equivalent in terms of phase matching and conversion efficiency that backscatter of the fundamental wave by the crystal material is as low as possible. In the case of a BBO crystal this is for example the orientations shown in FIGS. 6c) and d). As has already been explained hereinbefore that measure improves the power stability of the frequency-doubled radiation produced, when using laser sources which have a sensitive reaction to backscatter.

Figure 3:
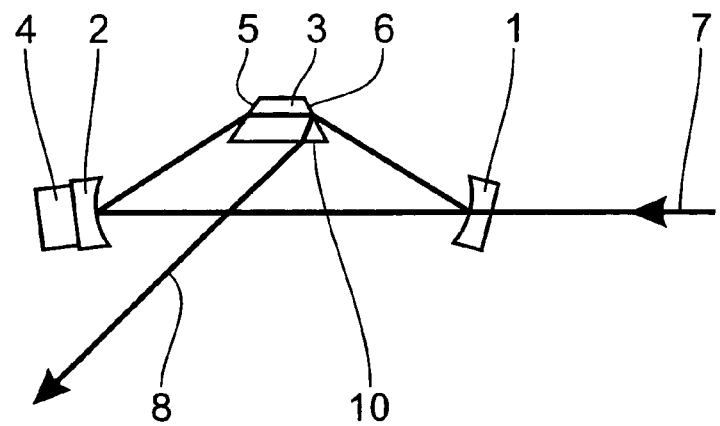
FIG. 3 shows a diagrammatic view of a second embodiment.

In another embodiment as shown in FIG. 3 the surface 6 is at the Brewster angle relative to the laser beam and bears a polarisation beam splitter layer which is highly transparent for the fundamental wave and highly reflecting for the doubled frequency. The converted beam produced in the crystal is reflected at the surface 6 and passes out of the crystal through a further surface 10 which has an antireflection coating for the doubled frequency. The coupling-out losses for the converted beam are thereby even lower in this embodiment than in the embodiment of FIG. 2. Otherwise the embodiment of FIG. 3 corresponds to that of FIG. 2.

Figure 4:
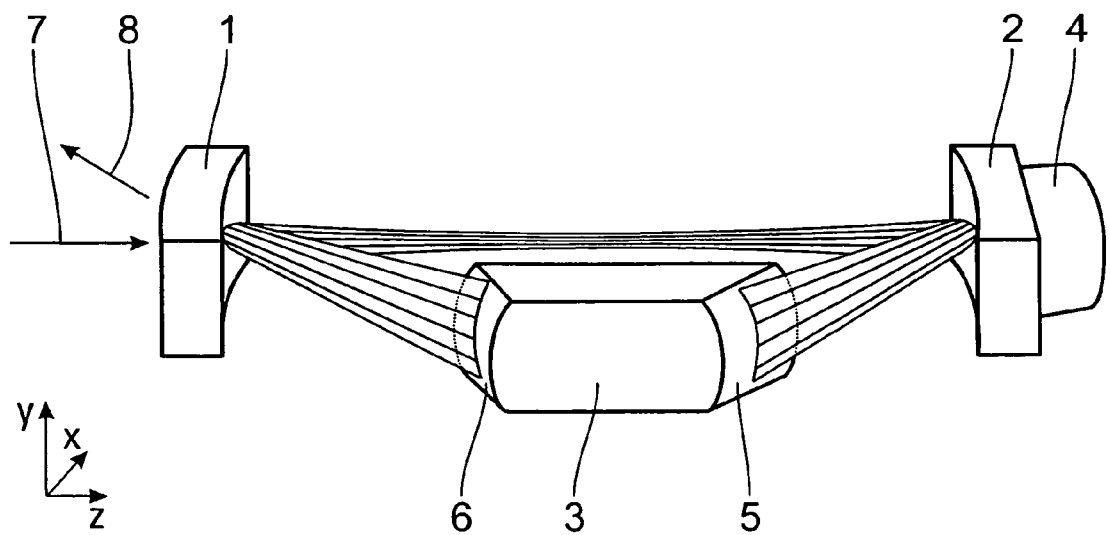
FIG. 4 shows a diagrammatic view of a third embodiment.

In a further embodiment as shown in FIG. 4 the non-linear crystal 3 is provided with cylindrically curved surfaces both on the entry side 5 and also on the exit side 6. For better understanding, the arrangement of FIG. 4 is shown as a perspective view with exaggeratedly large beam spreads. The resonator mirrors are not provided as is otherwise usual with spherically curved surfaces but with cylindrically curved surfaces. Otherwise the embodiment corresponds to that shown in FIG. 2. The co-ordinate system illustrated in FIG. 4 serves to identify the various directions in space and has nothing to do with the crystallographic axes of the crystal. The light wave circulating in the ring resonator is in the xz-plane, referred to hereinafter as the resonator plane. The incident fundamental wave 7 is propagated in the z-direction and polarised in the x-direction. It is coupled into the resonator through the coupling-in mirror 1. At the same time that mirror serves as a coupling-out mirror for the converted beam 8. The mirror 2 is mounted on a piezo element 4 for the purposes of resonator tuning. The uncoated entry surface 5 of the crystal is at the Brewster angle relative to the incident fundamental wave while the antireflection-coated exit surface 6 is approximately at an angle involving perpendicular incidence. The plane of incidence of the crystal entry surface coincides with the resonator plane in FIG. 4, while the principal section plane is perpendicular thereto. Therefore the direction of polarisation of the fundamental wave is in the plane of incidence (p-polarisation) so that the reflection losses at the Brewster surface 5 are low.

The crystal surfaces are curved in the principal section plane, that is to say the axes of symmetry of those cylindrical surfaces are in the resonator plane. In contrast the axes of symmetry of the cylindrical mirror surfaces are perpendicular to the resonator plane. This crossed arrangement of cylinder surfaces produces an elliptical beam cross-section within the crystal. The large semiaxis of that ellipse lies in the principal section plane. That shape of beam cross-section reduces the walk-off effect occurring in the critically phase-matched crystal 3 as the deflection due to the walk-off effect occurs in the principal section plane, that is to say in the y-direction in FIG. 4. Beam spread in the y-direction can be varied by way of the radii of curvature of the cylindrical crystal surfaces without beam spread in the x-direction being influenced thereby. In contrast to the structure in U.S. Pat. No. 5,943,350 where an increase in the ratio between the axes of the ellipse involves an increase in the reflection losses, in the present invention the reflection losses at the crystal surfaces are only immaterially influenced by the ratio between the axes. As a result it is possible with the invention to achieve even very high ratios between the axes of 10:1 and higher so that even in the case of crystals with a particularly large walk-off angle, as for example in the case of a BBO crystal, the walk-off effect can be substantially eliminated. In that way both the level of conversion efficiency is increased and also the quality of the beam shape of the converted beam is improved as the interference-like distortion phenomena described in DE 198 32 647, due to the walk-off effect, practically no longer occur.

By virtue of a suitable choice of the radii of curvature of the cylindrical mirror surfaces which can be selected independently of the radii of curvature of the crystal surfaces, it can be provided that the beam cross-section is round at any location in the resonator portion between the mirrors 2 and 3. As was already mentioned in relation to the preceding embodiments, that simplifies mode matching when coupling the fundamental wave into the resonator.

The spacings of the optical elements in the resonator are also available as freely selectable parameters. They are selected in such a fashion that the cross-sectional area of the beam in the crystal is of an optimum size in relation to conversion efficiency at a predetermined crystal length.

Figure 5:
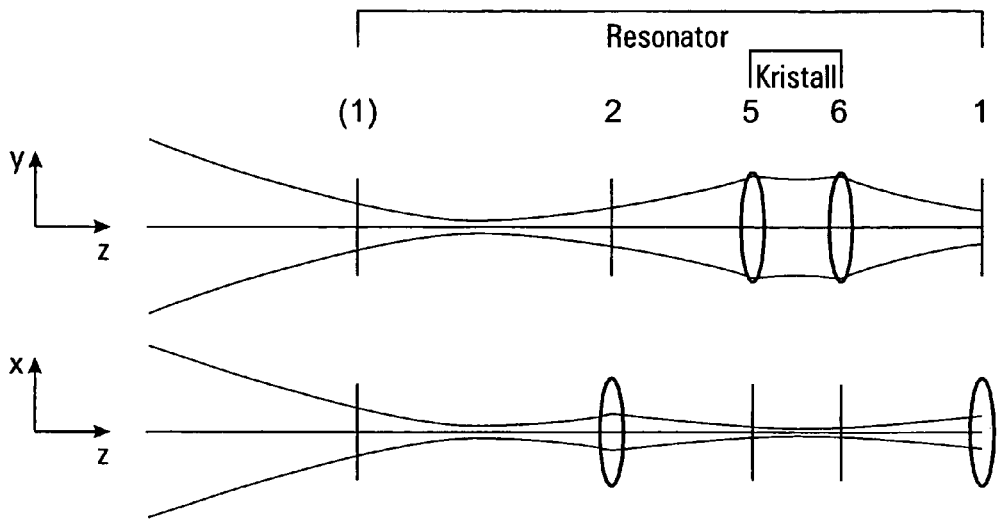
FIG. 5 shows the configuration of beam spread in the resonator of the third embodiment.

FIG. 5 shows the beam spreads of the fundamental wave separately for the two directions x and y. For the sake of improved clarity the beam path of the resonator is shown unfolded and straight. The resonator elements, depending on their respective action, are illustrated in the respective direction being considered as lenses or as lines. The beam spread effects are shown on a greatly enlarged scale for enhanced clarity of the drawing. The coupling-in mirror 1 is shown on the one hand in terms of its action as a coupling-in element on the left-hand side and on the other hand in terms of its action as a resonator mirror on the right-hand side in FIG. 5. The fundamental wave passes into the resonator, coming from the left, in the form of a convergent, round Gaussian beam. In this situation the coupling-in mirror 1 does not have any imaging action either in the x-direction or in the y-direction and is therefore illustrated as a line. A beam waist occurs between the coupling-in mirror 1 and the resonator mirror 2. It is of the same size in the x- and y-directions. The resonator mirror 2 does not have any imaging effect in the y-direction and is therefore here also shown as a line. Beam spread in the y-direction therefore further increases on the way from the mirror 2 to the entry surface 5 of the crystal. The entry surface 5 of the crystal acts as a convergent lens of a focal length which is approximately the same as the spacing relative to the beam waist between the mirrors 1 and 2. The beam is thereby approximately collimated and is of a relatively large diameter and involves slight divergence within the crystal. The exit surface 6 also acts as a lens with the same focal length and focuses the beam again on the same beam waist between the mirrors 1 and 2. The interposed mirror 1 does not have any imaging action on the beam.

In the x-direction the beam 2 has the action of a convergent lens which forms the image of the beam waist between the mirrors 1 and 2 on a beam waist in the crystal. In this case the crystal surfaces 5 and 6 do not have any imaging action. Finally the resonator mirror 1 again forms the image of the beam waist in the crystal on the waist between the mirrors 1 and 2.

The invention is not limited to the embodiments described herein. Rather it is possible to implement further embodiments by combining the features.

The invention claimed is:

1. An optical resonant frequency converter for a light wave, comprising:
   a ring resonator which includes a first mirror, a second mirror and a non-linear crystal with an entry surface and an exit surface which are so arranged that the light wave passes into the non-linear crystal in the form of a first laser beam through the entry surface and issues therefrom again through the exit surface, wherein the light wave is partially converted in the non-linear crystal from the first laser beam into a second laser beam of a different frequency,
   wherein a normal to the entry surface is approximately at the Brewster angle relative to the light wave incident into the crystal and the incident light wave is polarised parallel to a plane of the ring resonator,
   wherein the exit surface is antireflectively coated both for the frequency of the first and also the second laser beam and
   wherein the normal to the exit surface is at an angle of less than 15 degrees relative to the light wave issuing from the crystal.

2. The frequency converter of claim 1, wherein the first and second mirrors and the non-linear crystal are arranged such that a light source is formed in the ring resonator, the light source circulating in the resonator plane and passing into the non-linear crystal as a first laser beam through the entry surface and issuing therefrom again through the exit surface, the light source being partially converted in the non-linear crystal into the second laser beam which is at a higher frequency than the first laser beam and also issues from the non-linear crystal through the exit surface,
   wherein the first laser beam passes into the ring resonator through the first mirror and the second laser beam also issues from the ring resonator through the first mirror.

3. The frequency converter of claim 2, wherein:
   the reflecting surfaces of the two mirrors are spherically curved and the radii of curvature of said surfaces, the angles of incidence on said surfaces, the spacings of the optical elements in the ring resonator and the angles of incidence on the crystal surfaces are so selected that a fundamental mode is produced in the ring resonator which is of a round beam cross-section at any location of a free path between the first mirror and the second mirror.

4. The frequency converter of claim 1, wherein:
   the non-linear crystal has crystallographic axes that are oriented with respect to the direction of the incident light wave in such a way that critical phase matching applies in which the square of the effective non-linear coefficient is substantially equal to the maximum value in respect of its angle dependency and that the non-linear crystal scatters as small a part as possible of the incident light wave into the direction opposite to the direction of propagation of the incident light wave.

5. The frequency converter of claim 1, further comprising:
   a translation device for translation of one of the two mirrors for effecting resonance tuning of the ring resonator to the frequency of the first laser beam which is received by the ring resonator so that the light wave circulating in the resonator plane is formed in the ring resonator.

6. The frequency converter of claim 5, wherein:
   the second mirror is mounted on a piezo element as a component part of the translation device.

7. An optical resonant frequency converter for a light wave, comprising: a ring resonator comprising a first mirror, a second mirror and a non-linear crystal with an entry surface and an exit surface which are so arranged that the light wave is formed in the ring resonator, circulates in a resonator plane, and passes into the non-linear crystal as a first laser beam through the entry surface and issues therefrom again through the exit surface, the first laser beam being partially converted in the non-linear crystal into a second laser beam which is at a higher frequency than the first laser beam,
   wherein a normal to the entry surface is approximately at the Brewster angle relative to the light wave incident into the crystal,
   wherein a normal to the exit surface is approximately at the Brewster angle relative to the light wave issuing from the crystal,
   wherein the light wave circulating in the ring resonator is polarised parallel to the resonator plane,
   wherein a polarization beam splitter layer is provided at the exit surface, the polarization beam splitter layer being substantially transparent for the frequency of the first laser beam and reflecting for the frequency of the second laser beam,
   wherein the non-linear crystal has a third surface which is antireflectively coated for the frequency of the second laser beam and
   wherein the second laser beam is reflected at the polarization beam splitter layer and issues from the non-linear crystal through the third surface.

8. The frequency converter of claim 7, wherein:
the reflecting surfaces of the two mirrors are spherically curved and the radii of curvature of said surfaces, the angles of incidence on said surfaces, the spacings of the optical elements in the ring resonator and the angles of incidence on the crystal surfaces are so selected that a fundamental mode is produced in the ring resonator which is of a round beam cross-section at any location of a free path between the first mirror and the second mirror.

9. The frequency converter of claim 7, wherein:
the non-linear crystal has crystallographic axes that are oriented with respect to the direction of the incident light wave in such a way that critical phase matching applies in which the square of the effective non-linear coefficient is substantially equal to the maximum value in respect of its angle dependency and that the non-linear crystal scatters as small a part as possible of the incident light wave into the direction opposite to the direction of propagation of the incident light wave.

10. The frequency converter of claim 7, further comprising:
a translation device for translation of one of the two mirrors for effecting resonance tuning of the ring resonator to the frequency of the first laser beam which is received by the ring resonator so that the light wave circulating in the resonator plane is formed in the ring resonator.

11. The frequency converter of claim 10, wherein:
the second mirror is mounted on a piezo element as a component part of the translation device.

12. An optical resonant frequency converter, comprising:
a ring resonator which includes a first mirror, a second mirror and a critically phase-matched non-linear crystal having an entry surface and an exit surface which are not parallel to each other, which are so arranged that a circulating light wave formed in the ring resonator passes into the non-linear crystal as a first laser beam through the entry surface and issues therefrom again through the exit surface and which is partially converted in the non-linear crystal into a second laser beam which is at a higher frequency than the first laser beam,
wherein the non-linear crystal has crystallographic axes that are so oriented relative to the direction of the incident light wave that the square of the effective non-linear coefficient is near to or equal to the maximum value in respect of its angle dependency and
wherein the non-linear crystal scatters as small a part as possible of the incident light wave in the direction opposite to the direction of propagation of the incident light wave.

13. The frequency converter of claim 12, wherein: the first laser beam passes into the ring resonator through the first mirror and the second laser beam also issues from the ring resonator through the first mirror.

14. The frequency converter of claim 13, wherein: the reflecting surfaces of the two mirrors are spherically curved and the radii of curvature of said surfaces, the angles of incidence on said surfaces, the spacings of the optical elements in the ring resonator and the angles of incidence on the crystal surfaces are so selected that a fundamental mode is produced in the ring resonator which is of a round beam cross-section at any location of a free path between the first mirror and the second mirror.

15. The frequency converter of claim 12, wherein:
the non-linear crystal has crystallographic axes that are oriented with respect to the direction of the incident light wave in such a way that critical phase matching applies in which the square of the effective non-linear coefficient is substantially equal to the maximum value in respect of its angle dependency and that the non-linear crystal scatters as small a part as possible of the incident light wave into the direction opposite to the direction of propagation of the incident light wave.

16. The frequency converter of claim 12, further comprising:
a translation device for translation of one of the two mirrors for effecting resonance tuning of the ring resonator to the frequency of the first laser beam which is received by the ring resonator so that the light wave circulating in the resonator plane is formed in the ring resonator.

17. The frequency converter of claim 16, wherein:
the second mirror is mounted on a piezo element as a component part of the translation device.

18. An optical resonant frequency converter, comprising:
a ring resonator which includes a first mirror, a second mirror and a critically phase-matched non-linear crystal having an entry surface and an exit surface which are so arranged that a light wave formed in the ring resonator circulates in a resonator plane and passes into the non-linear crystal as a first laser beam through the entry surface and issues therefrom again through the exit surface, the first laser beam being partially converted in the non-linear crystal into a second laser beam which is at double the frequency of the first laser beam,
wherein at least one of the two surfaces of the non-linear crystal has a cylindrical curvature, wherein the axes of symmetry of said cylinder surfaces lie in the resonator plane, at least one of the two mirrors has a cylindrical curvature, wherein said cylinder surfaces have axes of symmetry that are perpendicular to the resonator plane, a principal section plane of the non-linear crystal is perpendicular to the resonator plane and a beam cross-section of the light wave in the non-linear crystal is of an elliptical shape whose longer semiaxis is in the principal section plane of the non-linear crystal.

19. The frequency converter of claim 18, wherein: the radii of curvature of the curved surfaces and the spacings of the optical elements in the ring resonator are so selected that a fundamental mode is produced in the ring resonator which is of a round beam cross-section at any location between the first mirror and the second mirror.

20. The frequency converter of claim 19, wherein:
at least one of the two surfaces of the non-linear crystal is uncoated and a normal to an uncoated surface in the resonator plane is substantially at the Brewster angle relative to the light wave incident into the crystal and issuing from the crystal respectively and the light wave circulating in the resonator is polarized parallel to the resonator plane.

21. The frequency converter of claim 20, wherein:
at least one of the two surfaces of the non-linear crystal is antireflectively coated both for the frequency of the first laser beam and also for the frequency of the second laser beam and a normal to a coated surface in the resonator plane is at an angle of less than 15 degrees relative to the light wave incident into the crystal and issuing from the crystal respectively.

22. The frequency converter of claim 21, wherein:
the first and second mirrors and the non-linear crystal are arranged such that the first laser beam passes into the ring resonator through the first mirror and the second laser beam also issues from the non-linear crystal through the exit surface and also issues from the ring resonator through the first mirror.

23. The frequency converter of claim 22, wherein:
a polarization beam splitter is provided at the exit surface of the non-linear crystal, the polarization beam splitter being substantially transparent for the frequency of the first laser beam and reflecting for the frequency of the second laser beam,
the non-linear crystal has a third surface which is antireflectively coated for the frequency of the second laser beam and
the second laser beam is reflected at the polarization beam splitter layer and issues from the non-linear crystal through the third surface.

24. The frequency converter of claim 23, wherein:
the non-linear crystal has crystallographic axes that are oriented with respect to the direction of the incident light wave in such a way that critical phase matching applies in which the square of the effective non-linear coefficient is substantially equal to the maximum value in respect of its angle dependency and that the non-linear crystal scatters as small a part as possible of the incident light wave into the direction opposite to the direction of propagation of the incident light wave.

25. The frequency converter of claim 24, further comprising:
a translation device for translation of one of the two mirrors for effecting resonance tuning of the ring resonator to the frequency of the first laser beam which is received by the ring resonator so that the light wave circulating in the resonator plane is formed in the ring resonator.

26. The frequency converter of claim 25, wherein:
the second mirror is mounted on a piezo element as a component part of the translation device.

27. A non-linear crystal for an optical resonant frequency converter as set forth in claim 26, wherein:
the non-linear crystal is of such a configuration that, upon fitting in the frequency converter, the crystallographic axes of the crystal are so oriented with respect to the direction of the incident light wave that critical phase matching applies in which the square of the effective non-linear coefficient is near or equal to the maximum value in respect of its angle dependency and that the non-linear crystal scatters as small a part as possible of the incident light wave into the direction opposite to the direction of propagation of the incident light wave.

28. The frequency converter of claim 18, wherein: at least one of the two surfaces of the non-linear crystal is uncoated and a normal to an uncoated surface in the resonator plane is substantially at the Brewster angle relative to the light wave incident into the crystal and issuing from the crystal respectively and the light wave circulating in the resonator is polarized parallel to the resonator plane.

29. The frequency converter of claim 28, wherein:
at least one of the two surfaces of the non-linear crystal is antireflectively coated both for the frequency of the first laser beam and also for the frequency of the second laser beam and a normal to a coated surface in the resonator plane is at an angle of less than 15 degrees relative to the light wave incident into the crystal and issuing from the crystal respectively.

30. The frequency converter of claim 29, wherein:
the first and second mirrors and the non-linear crystal are arranged such that the first laser beam passes into the ring resonator through the first mirror and the second laser beam also issues from the non-linear crystal through the exit surface and also issues from the ring resonator through the first mirror.

31. The frequency converter of claim 30, wherein:
a polarization beam splitter is provided at the exit surface of the non-linear crystal, the polarization beam splitter being substantially transparent for the frequency of the first laser beam and reflecting for the frequency of the second laser beam,
the non-linear crystal has a third surface which is antireflectively coated for the frequency of the second laser beam and
the second laser beam is reflected at the polarization beam splitter layer and issues from the non-linear crystal through the third surface.

32. The frequency converter of claim 18, wherein: at least one of the two surfaces of the non-linear crystal is antireflectively coated both for the frequency of the first laser beam and also for the frequency of the second laser beam and a normal to a coated surface in the resonator plane is at an angle of less than 15 degrees relative to the light wave incident into the crystal and issuing from the crystal respectively.

33. The frequency converter of claim 32, wherein:
the first and second mirrors and the non-linear crystal are arranged such that the first laser beam passes into the ring resonator through the first mirror and the second laser beam also issues from the non-linear crystal through the exit surface and also issues from the ring resonator through the first mirror.

34. The frequency converter of claim 33, wherein:
a polarization beam splitter is provided at the exit surface of the non-linear crystal, the polarization beam splitter being substantially transparent for the frequency of the first laser beam and reflecting for the frequency of the second laser beam,
the non-linear crystal has a third surface which is antireflectively coated for the frequency of the second laser beam and
the second laser beam is reflected at the polarization beam splitter layer and issues from the non-linear crystal through the third surface.

35. The frequency converter of claim 18, wherein: the first and second mirrors and the non-linear crystal are arranged such that the first laser beam passes into the ring resonator through the first mirror and the second laser beam also issues from the non-linear crystal through the exit surface and also issues from the ring resonator through the first mirror.

36. The frequency converter of claim 35, wherein:
a polarization beam splitter is provided at the exit surface of the non-linear crystal, the polarization beam splitter being substantially transparent for the frequency of the first laser beam and reflecting for the frequency of the second laser beam,
the non-linear crystal has a third surface which is antireflectively coated for the frequency of the second laser beam and
the second laser beam is reflected at the polarization beam splitter layer and issues from the non-linear crystal through the third surface.

37. The frequency converter of claim 18, wherein: a polarization beam splitter is provided at the exit surface of the non-linear crystal, the polarization beam splitter being substantially transparent for the frequency of the first laser beam and reflecting for the frequency of the second laser beam, the non-linear crystal has a third surface which is antireflectively coated for the frequency of the second laser beam and the second laser beam is reflected at the polarization beam splitter layer and issues from the non-linear crystal through the third surface.

38. The frequency converter of claim 1, wherein: the non-linear crystal has crystallographic axes that are oriented with respect to the direction of the incident light wave in such a way that critical phase matching applies in which the square of the effective non-linear coefficient is substantially equal to the maximum value in respect of its angle dependency and that the non-linear crystal scatters as small a part as possible of the incident light wave into the direction opposite to the direction of propagation of the incident light wave.

39. The frequency converter of claim 18, further comprising: a translation device for translation of one of the two mirrors for effecting resonance tuning of the ring resonator to the frequency of the first laser beam which is received by the ring resonator so that the light wave circulating in the resonator plane is formed in the ring resonator.

40. The frequency converter of claim 39, wherein: the second mirror is mounted on a piezo element as a component part of the translation device.

* * * * *